United States Patent
Wood et al.

(10) Patent No.: US 9,684,628 B2
(45) Date of Patent: Jun. 20, 2017

(54) MECHANISM FOR INSERTING TRUSTWORTHY PARAMETERS INTO AJAX VIA SERVER-SIDE PROXY

(75) Inventors: Jamey Wood, Louisville, CO (US); Robert Bissett, Peabody, MA (US); Gregory Murray, Campbell, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1798 days.

(21) Appl. No.: 12/239,950

(22) Filed: Sep. 29, 2008
(Under 37 CFR 1.47)

(65) Prior Publication Data

US 2010/0082771 A1 Apr. 1, 2010

(51) Int. Cl.
*G06F 15/16* (2006.01)

(52) U.S. Cl.
CPC .................................... *G06F 15/16* (2013.01)

(58) Field of Classification Search
USPC .......................................................... 709/219
See application file for complete search history.

(56) References Cited

U.S. PATENT DOCUMENTS

| | | | | |
|---|---|---|---|---|
| 5,774,660 | A * | 6/1998 | Brendel et al. | 709/201 |
| 6,073,175 | A * | 6/2000 | Tavs et al. | 709/226 |
| 6,185,625 | B1 * | 2/2001 | Tso | G06F 17/30905 707/E17.121 |
| 6,523,027 | B1 * | 2/2003 | Underwood | G06F 9/465 |
| 6,725,424 | B1 * | 4/2004 | Schwerdtfeger | G06F 17/30905 704/271 |
| 6,973,626 | B1 | 12/2005 | Lahti et al. | |
| 7,054,952 | B1 * | 5/2006 | Schwerdtfeger | G06F 17/30011 709/246 |
| 7,155,493 | B1 | 12/2006 | Weber | |
| 7,389,495 | B2 | 6/2008 | Wang et al. | |
| 7,409,439 | B2 | 8/2008 | Raja et al. | |
| 7,409,710 | B1 | 8/2008 | Uchil et al. | |
| 7,451,393 | B1 | 11/2008 | Herbison et al. | |
| 7,454,498 | B2 | 11/2008 | Shuster | |
| 7,454,745 | B2 | 11/2008 | Aridor et al. | |
| 7,454,755 | B2 | 11/2008 | Jacobs et al. | |
| 7,454,759 | B2 | 11/2008 | Mukundan et al. | |
| 7,490,141 | B1 * | 2/2009 | Cammarata | H04L 63/08 709/219 |
| 7,664,956 | B2 | 2/2010 | Goodman | |
| 7,937,478 | B2 | 5/2011 | Cheng et al. | |
| 7,941,609 | B2 * | 5/2011 | Almog | 711/137 |
| 8,417,766 | B2 * | 4/2013 | Lepeska | 709/203 |
| 8,843,997 | B1 * | 9/2014 | Hare | 726/3 |
| 2002/0035619 | A1 * | 3/2002 | Dougherty | G06F 17/30855 709/219 |
| 2002/0099829 | A1 * | 7/2002 | Richards | G06F 17/30899 709/227 |

(Continued)

OTHER PUBLICATIONS

Author Unknown, "Project jMaki", https://ajax.dev.java.net, 3 pages, May 3, 2008.

(Continued)

*Primary Examiner* — Blake Rubin
(74) *Attorney, Agent, or Firm* — Precision IP

(57) ABSTRACT

A system for retrieving information from a remote server is disclosed. The system includes a browser having a webpage executing JavaScript adapted to communicate a request with client identifying information to a first server. The first server has a proxy adapted to dynamically insert information into the request received from the client and communicate the request with inserted information to a second server, whereby the request with inserted information is trusted by the second server. The second server and first server are each adapted to also provide a response to the request. A method of communicating in a networked environment is also disclosed.

19 Claims, 6 Drawing Sheets

(56) References Cited

U.S. PATENT DOCUMENTS

| | | | |
|---|---|---|---|
| 2003/0009672 A1 | 1/2003 | Goodman | |
| 2003/0110151 A1 | 6/2003 | Fortier | |
| 2004/0073634 A1* | 4/2004 | Haghpassand | 709/220 |
| 2004/0172620 A1* | 9/2004 | Perez | G06F 9/45504 717/118 |
| 2004/0186912 A1* | 9/2004 | Harlow | G06Q 20/40 709/237 |
| 2005/0108517 A1* | 5/2005 | Dillon | G06F 17/30902 713/150 |
| 2005/0273849 A1* | 12/2005 | Araujo | H04L 63/0428 726/12 |
| 2006/0168221 A1* | 7/2006 | Juhls | H04L 63/08 709/225 |
| 2006/0277596 A1* | 12/2006 | Calvert et al. | 726/3 |
| 2007/0136443 A1* | 6/2007 | Sah et al. | 709/219 |
| 2007/0180099 A1 | 8/2007 | Tsimelzon et al. | |
| 2007/0220145 A1* | 9/2007 | Kozakura et al. | 709/225 |
| 2007/0220599 A1* | 9/2007 | Moen | H04L 63/0227 726/12 |
| 2007/0298773 A1 | 12/2007 | Uematsu et al. | |
| 2008/0072305 A1* | 3/2008 | Casado | H04L 63/0492 726/11 |
| 2008/0072306 A1* | 3/2008 | Krasnoiarov | H04L 63/0227 726/12 |
| 2008/0077982 A1* | 3/2008 | Hayler et al. | 726/12 |
| 2008/0077983 A1* | 3/2008 | Meyer et al. | 726/12 |
| 2008/0098301 A1* | 4/2008 | Black et al. | 715/246 |
| 2008/0141341 A1* | 6/2008 | Vinogradov et al. | 726/2 |
| 2008/0209028 A1* | 8/2008 | Kurup et al. | 709/224 |
| 2008/0209451 A1* | 8/2008 | Michels | G06F 15/16 719/328 |
| 2008/0281798 A1* | 11/2008 | Chatterjee | G06F 17/30902 |
| 2008/0298342 A1* | 12/2008 | Appleton et al. | 370/351 |
| 2008/0319952 A1* | 12/2008 | Carpenter | G06F 17/3064 |
| 2009/0006523 A1* | 1/2009 | Kordun | G06F 17/3089 709/202 |
| 2009/0144159 A1* | 6/2009 | Bashyam | G06Q 30/0257 705/14.55 |
| 2009/0177761 A1* | 7/2009 | Meyer et al. | 709/219 |
| 2009/0234972 A1* | 9/2009 | Raghu et al. | 709/246 |
| 2009/0328063 A1* | 12/2009 | Corvera | G06F 9/54 719/315 |
| 2010/0042680 A1* | 2/2010 | Czyzewicz | G06Q 10/10 709/203 |
| 2010/0064234 A1* | 3/2010 | Schreiber et al. | 715/760 |
| 2010/0228963 A1* | 9/2010 | Kassab et al. | 713/150 |
| 2011/0055683 A1* | 3/2011 | Jiang | 715/234 |

OTHER PUBLICATIONS

Garrett, Jesse James, "Ajax: A New Approach to Web Applications", http://www.adaptivepath.com/ideas/essays/archives/000385.php, 5 pages, Feb. 18, 2005.

Murray et al., "Restricting Access to Ajax Services", http://java.sun.com/developer/technicalArticles/J2EE/usingapikeys/index.html, 5 pages, Sep. 2007.

Ort et al., "Mashup Styles, Part 1: Server-Side Mashups", http://java.sun.com/developer/technicalArticles/J2EE/mashup_1/, 10 pages, May 2007.

Stamos et al., "Attacking AJAX Web Applications", Information Security Partners, LLC, pp. 1-73, Aug. 3, 2006.

Sureau, Denis, "Ajax Tutorial (Asynchronous Javascript and XML)", http://www.xul.fr/en-xml-ajax.html, 7 pages, 2006.

Author Unknown, "Best Practices for Speeding Up Your Web Site," http://developer.yahoo.com/performance/rules.html, 11 pages, at least as early as Nov. 21, 2008.

Author Unknown, "Exceptional Performance," http://developer.yahoo.com/performance/, 2 pages, at least as early as Nov. 21, 2008.

Author Unknown, "jMaki," http://jmaki.com/, 3 pages, at least as early as Oct. 7, 2008.

Author Unknown, "jMaki Ajax Performance Enhancer," https://ajax.dev.java.net/performance.html, 3 pages, at least as early as Jun. 10, 2008.

Mott, Carla, "Enabling performance feature in jMaki," http://weblogs.java.net/blog/carlavmott/archive/2008/10/enabling_perfor.html, 4 pages, Oct. 22, 2008.

Non-Final Office Action regarding U.S. Appl. No. 12/395,253, dated Mar. 26, 2013.

Response to Non-Final Office Action regarding U.S. Appl. No. 12/395,253, dated Jun. 26, 2013.

Final Office Action regarding U.S. Appl. No. 12/395,253, dated Aug. 6, 2013.

Response to Final Office Action regarding U.S. Appl. No. 12/395,253, dated Oct. 7, 2013.

Advisory Action regarding U.S. Appl. No. 12/395,253, dated Oct. 22, 2013.

Response to Final Office Action regarding U.S. Appl. No. 12/395,253, dated Jan. 6, 2014.

Advisory Action regarding U.S. Appl. No. 12/395,25, dated Jan. 16, 2014.

Response to Final Office Action regarding U.S. Appl. No. 12/395,253, dated Feb. 6, 2014.

Non-Final Office Action regarding U.S. Appl. No. 12/395,253, dated Jul. 31, 2014.

Response to Non-Final Office Action regarding U.S. Appl. No. 12/395,253, dated Oct. 31, 2014.

Final Office Action regarding U.S. Appl. No. 12/395,253, Feb. 16, 2012.

Non-Final Office Action, U.S. Appl. No. 12/395,253, Sep. 27, 2010.

Amendment and Response to Non-Final Office Action, U.S. Appl. No. 12/395,253, Jan. 27, 2011.

Final Office Action, U.S. Appl. No. 12/395,253, Apr. 12, 2011.

Amendment and Response to Final Office Action, U.S. Appl. No. 12/395,253, Jul. 12, 2011.

Non-Final Office Action, U.S. Appl. No. 12/395,253, Oct. 18, 2011.

Amendment and Response to Non-Final Office Action, U.S. Appl. No. 12/395,253, Jan. 18, 2012.

Amendment and Response to Final Office Action regarding U.S. Appl. No. 12/395,253, Jun. 18, 2012.

Notice of Allowance regarding U.S. Appl. No. 12/395,253, dated Nov. 13, 2014.

\* cited by examiner

MECHANISM FOR INSERTING TRUSTWORTHY PARAMETERS INTO AJAX VIA SERVER-SIDE PROXY

FIELD OF THE INVENTION

The present invention relates to network communication systems, and in particular communication between client and server, as well as between servers.

BACKGROUND

As is known, a web browser communicates with a server. The web browser may submit a request to a server for a webpage or other information or application. The server serves a response to the browser. Thus, in a basic webpage request/response arrangement, a browser sends a request to a web server and in exchange receives a webpage. Each new request results in a new webpage. The webpage can further include JavaScript. When using JavaScript, a new request may be made to the server. In this case, rather than a new webpage, new data is provided in response which data is presented in the same webpage, i.e., the content of the webpage may change, or in other words, the webpage is not reloaded on the user's system. These types of requests are commonly termed "AJAX" requests. AJAX requests may be to the original domain or to a separate domain through a proxy.

Unfortunately, information running on a webpage is generally open and available for others to see. Furthermore, due to JavaScript's security model, JavaScript in a webpage can only communicate with the same domain from which the webpage was originally retrieved. Thus, the webpage executing JavaScript cannot pull information from other webpages or remote servers directly or separate from the original server that is associated with the website.

To request information from a remote server, a request must be made through proxy. In a typical "Web 2.0" application use, JavaScript running in the user's browser may access information from a remote second web application or server. These AJAX requests occur through a proxy in the original application server which communicates with the remote server. In other words, JavaScript communicates a request to the original server which has a proxy therein. The original server, via proxy, passes the request on to an external or remote server and may subsequently pass the response back from the remote server to JavaScript running in the webpage. Thus, the proxy may send information to other websites or servers to pull information from those other webpages. Restrictions are often placed upon proxies limiting the servers to which they may communicate, so as to avoid or reduce the risk of illegal or unauthorized behavior.

Trusted relationships are important to the operating environment described. A trusted relationship exists between the client (i.e., the browser with the webpage running JavaScript) and the original server. As a result of this relationship, the client and original server can share session information. A trusted relationship also exists between servers. Thus, two servers can share private information as well. However, a trusted relationship does not exist between the browser and the remote server. As a result, a remote server cannot trust raw information passed from the browser, even if it passes through the proxy.

Due to the lack of trust, this arrangement does not allow for the original application to retrieve personal information from the remote application or server. Furthermore, the identifying information cannot come from JavaScript creating the request, because this information can be easily viewed and/or altered. Moreover, JavaScript includes a security model which permits it to only make a request back to its original domain. In most general terms, JavaScript cannot talk to other, remote servers to obtain information.

Accordingly, a mechanism and method for allowing an application proxy to dynamically insert trusted information into a request to a remote server in order to safely retrieve protected or sensitive information requested by a client is provided. Additionally, a system to prove the identity of the client to a remote server or to establish a trusted relationship between client, original and remote servers is provided.

SUMMARY

A system for retrieving information from a remote server is disclosed. The system includes a browser having a webpage executing JavaScript adapted to communicate a request with client identifying information to a first server. The first server has a proxy adapted to dynamically insert information into the request received from the client and communicate the request with inserted information to a second server, whereby the request with inserted information is trusted by the second server. The second server and first server are each adapted to also provide a response to the request.

A further system for communicating with a server is provided. The system includes a client computer in communication with a first server and adapted to communicate a request to the first server the request including a first trustworthy parameter. The first server executes a proxy and is capable of inserting a second trustworthy parameter into the request received from the client computer. The second trustworthy parameter may be an additional parameter or may replace the first trustworthy parameter. The first server is also capable of communicating the request with at least the second trustworthy parameter via proxy to a second server which is in communication with the first server.

A server system is also provided. The server system comprises a first server adapted to communicate with a client computer and adapted to receive a request from the client computer including a first trustworthy parameter. The first server executes a proxy. The first server is capable of inserting a second trustworthy parameter into the request received from the client computer and communicating the request with at least the second trustworthy parameter via proxy to a second server in communication with the first server.

A method of communicating in a networked environment is also provided. The method includes a client computer communicating a request to an original server. The request includes identifying information. The original server inserts at least one trustworthy parameter into the request and communicates the request with trustworthy parameter via proxy to a remote server. The remote server serves a response to the request to the original server. The original server serves the response to the client computer.

The mechanism and method for inserting trustworthy parameters of an embodiment may allow an application to safely assert the identity of the user and the application itself into a request so that a remote server can trust that protected information may be safely included in a response. The foregoing system and method allows users to be authenticated into a remote application or server, allowing the user full access to data through the proxy web application without first having to go through, for example, an extra step of logging into the remote application. Moreover, the mechanism and method described herein allow the client to perform additional functions on a website, such as the ability to read and write on a remote website rather than viewing a file in "read-only" format. The invention allows mutually-trusted applications to be able to assert the identity of a user making the request. Moreover, the addition of information to the request takes place in a manner that is transparent to the user.

DETAILED DESCRIPTION

Figure 1:
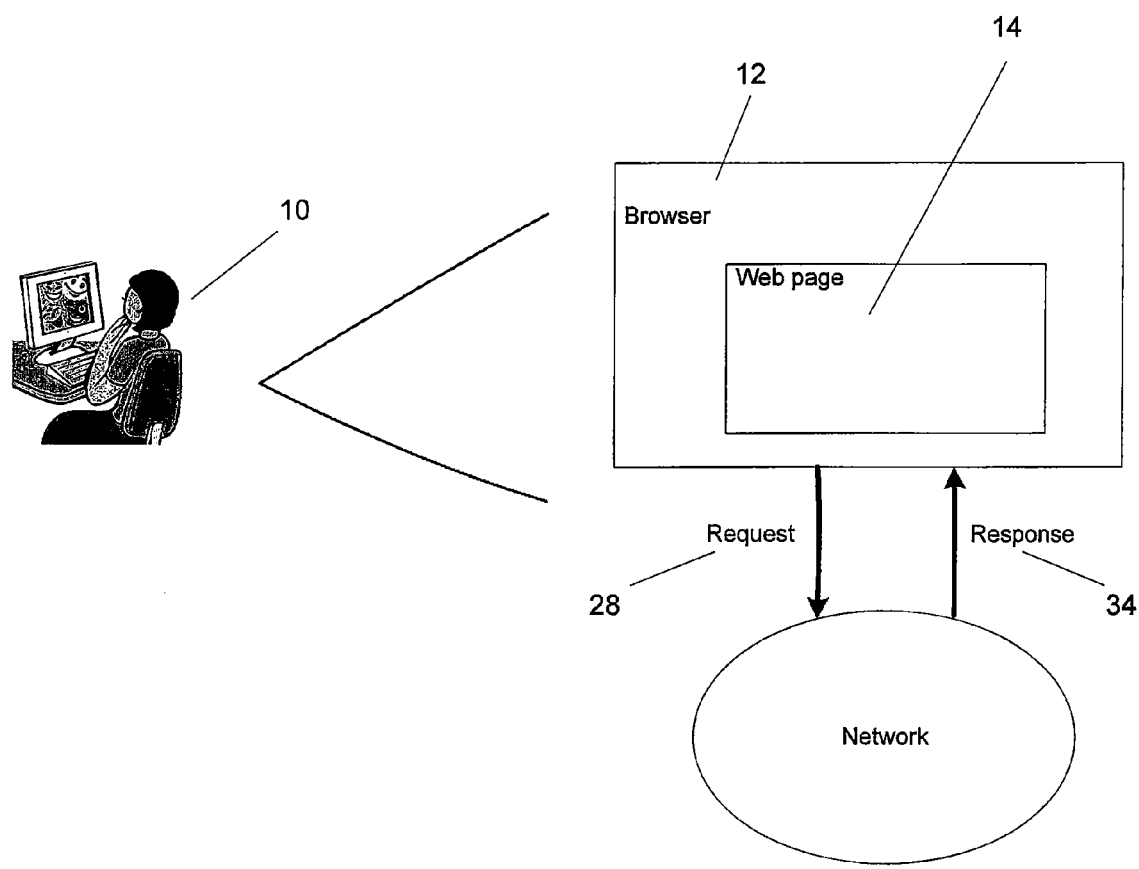
FIG. 1 is a flow chart illustrating a general user or client interface with a browser and website.

Embodiments of the present invention can be implemented on software running on a computer system. The system herein, therefore, may be operated by computer-executable instructions, such as program modules, executable on a computer. Program modules may include routines, programs, objects, components, data structures and the like which perform particular tasks or implement particular instructions. The software program may be operable for supporting the transfer of information within a network of trusted partner sites using artifacts.

The computers for use with the system and various components described herein may be programmable computers which may be special purpose computers or general purpose computers that execute the system according to the relevant instructions. The computer system can be an embedded system, a personal computer, notebook computer, server computer, mainframe, networked computer, handheld computer, personal digital assistant, workstation, and the like. Other computer system configurations may also be acceptable, including, cell phones, mobile devices, multi-processor systems, microprocessor-based or programmable electronics, network PC's, minicomputers, and the like. Preferably, the computing system chosen includes a processor suitable in size to efficiently operate one or more of the various systems or functions of the invention.

The system or portions thereof may also be linked to a distributed computing environment, where tasks are performed by remote processing devices that are linked through a communications network. To this end, the system may be configured or linked to multiple computers in a network, including, but not limited to a local area network, a wide area network, a wireless network, and the Internet. Therefore, information and data may be transferred within the network or system by wireless means, by hardwire connection or combinations thereof.

The computer can also include a display, provision for data input and output, etc. Furthermore, the computer or computers may be operatively or functionally connected to one or more mass storage devices, such as, but not limited to a database. The memory storage can be volatile or non-volatile and can include removable storage media. The system may also include computer-readable media which may include any computer readable media or medium that may be used to carry or store desired program code that may be accessed by a computer. The invention can also be embodied as computer readable code on a computer readable medium. To this end, the computer readable medium may be any data storage device that can store data which can be thereafter read by a computer system. Examples of computer readable medium include read-only memory, random-access memory, CD-ROM, CD-R, CD-RW, magnetic tapes, and other optical data storage devices. The computer readable medium can also be distributed over a network coupled computer system so that the computer readable code is stored and executed in a distributed fashion.

In one or more embodiments, for example, the computer system (FIG. 1) includes a first computer having a browser 12 or the like operable to access an internet or intranet application. For example, a webpage 14 may be accessed by a user by selecting the browser 12 and entering in an address for a particular website. A user or internet user may use any system or device which may be connectable to the internet for access thereto, including, but not limited to personal computer, mobile phones, PDA, MP3 player, and the like. Generally, these devices include a graphical user interface (GUI) or a communication means by which website content may be displayed or communicated. Thus, the user accesses the internet by this device and typically visits a website or webpage 14. When a user visits a particular website or webpage 14, a user essentially requests a particular page, such as a homepage. The request is provided to a web server to render this page. The images scheduled for that page at that particular time and day may be rendered to the user.

The content of the webpage 14 and contact or access by a user of the webpage is generally managed by a web server 18. The web server 18 may be in functional or operable communication with an additional server 22, such that it may exchange information or data with the additional server. To this end, the web server 18 may request information or content from the additional server 22 to be displayed on the webpage 14 in response to a user contact or selection on the webpage 14. Alternatively, the browser 12 or webpage 14, if not using JavaScript, may also request a page from the web server, then on receipt, may directly request one or more content pieces from the additional server such that communication of the content may be from or between the webpage 14 and additional server. The foregoing systems are generally referred to, respectively, as server-side serving and client-side serving. It is also possible that a server system may or may not be inside the web server.

When a web server 18 is rendering the page, a request 28 is made to the additional system server 22. The request 28 may be specific, such as for specific information or content for display on the webpage 14, or may be a general request. The content may be static, such as a picture or text, or may include or be formed of an audio component or video component. In response to the request to the additional system server, content is delivered to the web server for display in the particular webpage 14 that meets this request. The web server 18 may arrange the content for placement in the webpage 14. It is contemplated that a delivery engine, which may be a dynamic engine, may be used to interact with the user to deliver the content in response to user actions. The delivery engine may be a part of the web server 18, or may exist as a separate component.

Figure 2:
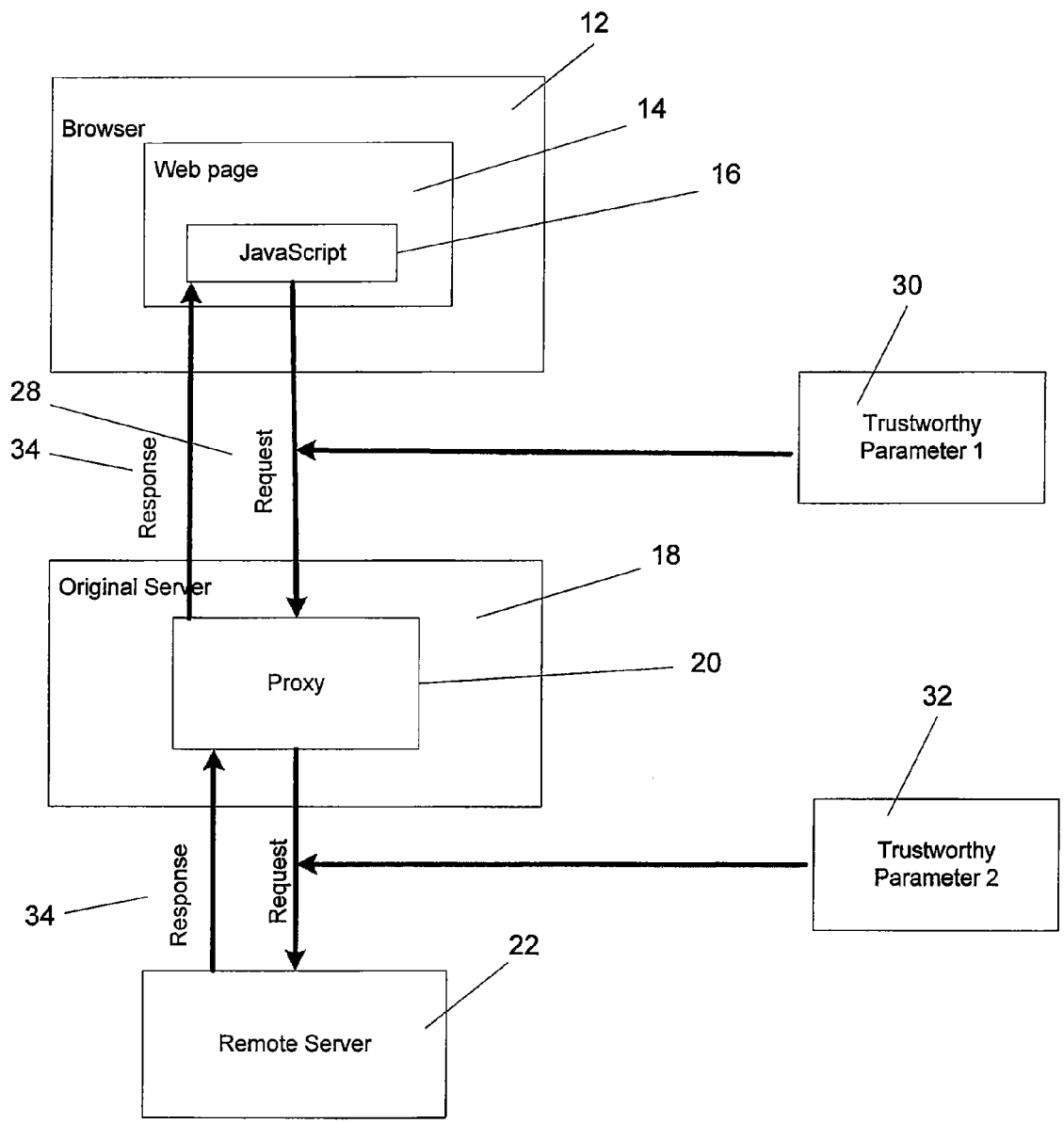
FIG. 2 is a flow chart illustrating one or more examples of embodiments of the mechanism for inserting trustworthy parameters.
Figure 3:
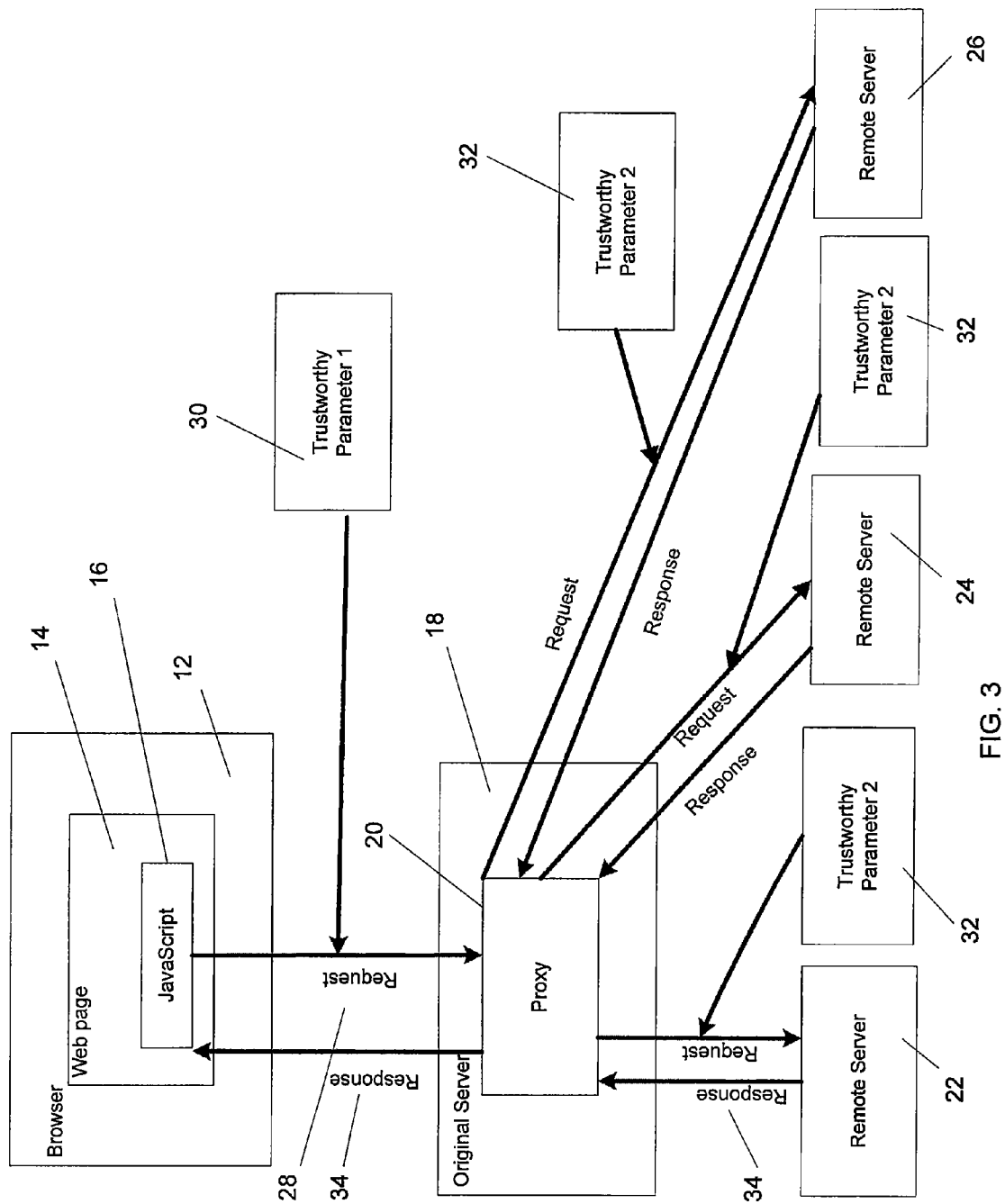
FIG. 3 is a flow chart illustrating one or more examples of embodiments of the mechanism for inserting trustworthy parameters of FIG. 2, including a plurality of remote servers.

In one or more embodiments of the system described herein, as shown in FIGS. 1-3, a client 10 computer 10 with a browser 12 is provided for calling upon a webpage 14. The browser 12 may be running JavaScript 16. An original server 18 is also provided in communication with the browser 12 to serve the webpage 14 to the browser 12 for rendering on the client 10 computer. The original server 18 may include a proxy 20 for communicating with a second or remote server 22. Thus, a remote server 22 may be provided in communication with the original server 18. While a single original server 18 and remote server 22 are described herein, any number of original and remote servers 22, 24, 26 may be provided without departing from the overall scope of the present invention (see e.g., FIG. 3).

The browser 12 provided in the client 10 computer provides a user interface that allows navigation of objects. In one or more embodiments, the browser 12 is a web browser, which may be a software application that enables a user to display and interact with text, images, videos, music and other information typically located on a webpage 14 at a website on the World Wide Web or a local area network. The browser 12 may also be used to access information provided by web servers in private networks or content in file systems. Text and images on a webpage 14 may contain hyperlinks to other webpages at the same or different website. The webpage 14 may also include embedded images, animations, video, sound, and streaming media or may be accessible through the webpage 14. To this end, the web browser 12 may allow a user to quickly and easily access information provided on many webpages at many websites. The web browser 12 may also format information for display. The file format for a webpage 14 may be any suitable format, including, but not limited to HTML (hyper-text markup language), XML, as well as, for example JPEG, PNG and GIF image formats, and can be extended to support additional formats.

The browser 12 may communicate with a server or original server 18 (see FIGS. 2-3). In the embodiment, the web browser 12 may communicate with a web server using any suitable language to fetch webpages, such as, for example, HTTP (hypertext transfer protocol), and may also use JavaScript 16 to request or exchange data for use in the webpage 14. Generally, web pages may be located by means of a URL (uniform resource locator). A variety of URL types and their corresponding protocols may be used, such as, but not limited to, HTTP, gopher (a hierarchical hyperlinking protocol), FTP (file transfer protocol), RTSP (real-time streaming protocol), and HTTPS (an SSL encrypted version of HTTP). While web browsers are specifically described, other applications may also be contemplated, such as but not limited to file browsers and code browsers.

As indicated, the browser 12 may operate a webpage 14 running JavaScript 16. To this end, JavaScript code may run locally in a user's or client's browser 12. JavaScript 16 may be used in one or more websites to enable scripting access to objects embedded in other applications. The host environment for JavaScript 16 may be the web browser 12. In one or more embodiments, as shown in FIGS. 2-3, JavaScript 16 dispatches requests for information (such as content) to the server 18. A JavaScript engine or JavaScript interpreter or JavaScript implementation may be provided as an interpreter that interprets JavaScript source code and executes the script accordingly. AJAX programming may be used for communication with a server, whether the communication occurs in the form of a call to the original domain 18 or server, or through a proxy 20 to, for example, a second domain or server.

An original server 18 is in operable communication with the client computer 10 and may be in communication with the browser 12 (FIGS. 2-3). The original server 18 may be the server associated with the website, namely, the server which returns the webpage 14 for rendering to the user. The original server 18 may be any suitable server capable of accomplishing the tasks described herein. To this end, the server may be an application server, communications server, database server, proxy server, fax server, file server, print server, game server, standalone server, web server, web feed server, client-server, X server, or catalog server. In the illustrated embodiment, the server may be a web server with a proxy 20 or proxy server.

The proxy 20, as shown in FIGS. 2-3, may exist in the original server 18 and may be a server, i.e., a computer system or an application program, which services the requests of its clients 10 by forwarding requests from its clients to other servers 22 or 24 or 26. While the illustrated embodiment provides a proxy 20 in the original server 18, the proxy server may be placed in the user's local computer or at specific key points between the user and the destination servers or the Internet.

In the embodiment shown in FIGS. 2-3, the client 10 communicates with the original server 18 and connects to the proxy 20 therein, requesting some service. For example, the request may be for a file, a connection, a web page, an application, or other resource, available from a different server. The proxy 20 provides the requested resource by connecting to the specified server and requesting the service on behalf of the client 10. In the illustrated embodiment, the proxy 20 is a web proxy 20. The web proxy 20 operates in the website server or original server 18 and may respond to user or client 10 requests for resources or information from remote servers 22, 24, or 26. The web proxy 20 may include a configuration that determines which websites the server is willing to serve. More specifically, the proxy 20 may have a configuration module which defines a list of final destinations or remote servers 22, 24, and/or 26 it is willing to serve. To this end, the web proxy 20 may provide a means to deny access to certain URLs and thus provide content filtering. In one or more embodiments, the proxy 20 may restrict websites to those which the client 10 has access. The proxy 20 and specifically, the configuration module, may include a list of acceptable sites in any combination of features, such as, but not limited to, server name, date, tree, URL and so forth. For instance, the client 10 communicating with website A may make a specific request through the proxy 20 to a website or for a website, i.e., website B. The configuration module, which has a website B URL, may permit the original server 18 for website A to communicate via proxy 20 with website B. The acceptable websites within the configuration module may also be more limited. For example, some property expansion may exist inside the URL string. In other words, another value, a bracket, etc. may be provided within the string. An example specific to jMaki of configuration of the proxy 20 may be:

```
{
    "id":       "example_server",
    "url":      "http://example.com/foo?ownerId=$
                {REMOTE_USER}&viewerId=$
                {REMOTE_USER}",
    "apikey":   "&apikey=abc1234"
}
```

Accordingly, in this example, if a user of this webpage 14 desired to use the proxy 20 to go to "example.com", the address "example.com" is not needed. Instead, the request from the browser 12 may state "send the request to example_server". In this example, the actual web address may be present, but is located in a the file in a location where browsers and clients or users do not have access to it.

The web proxy 20 may also reformat web pages for a specific purpose or audience or rendering device. As described herein, the proxy 20 may alter the client's request, and may also modify the server's response. If is further contemplated that the proxy 20 may serve the request without contacting the specified server, for example, in one or more embodiments the proxy 20 may 'cache' a request.

Figure 5:
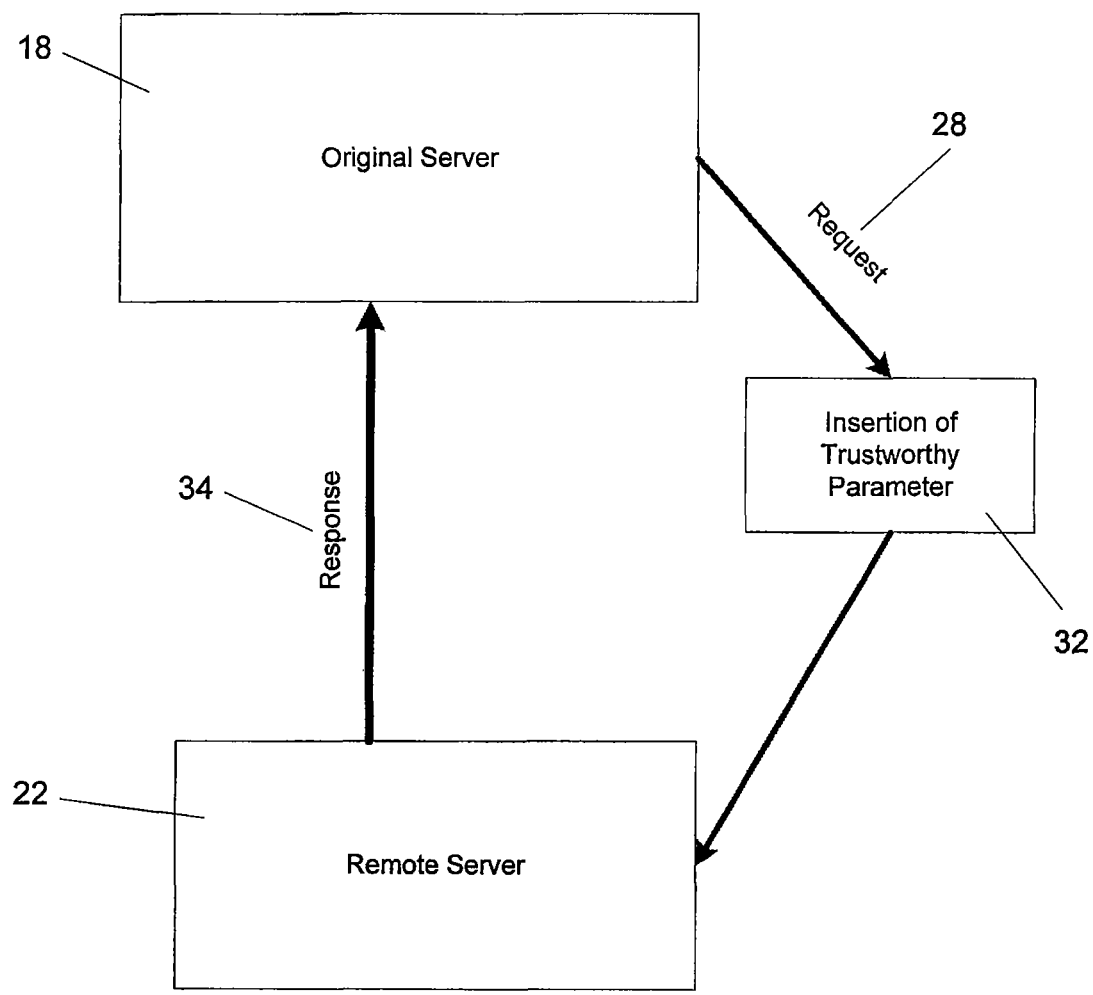
FIG. 5 is a flow chart illustrating the flow of information between the original server and a remote server in the mechanism for inserting trustworthy parameters of FIG. 2.

The original server 18 or first server may be provided in operable communication with and may communicate with one or more second or remote servers 22, 24, 26 (see FIGS. 2-3, & 5). The remote server 22 may be used for any suitable purpose. In one or more embodiments, the remote server 22 may include applications that are employed alongside the existing applications run by the client 10, such as, but not limited to, applications which improve functionality. For example, the application may add some functionality to the website such as may be used in an intranet or corporate computing environment, as well as may be used on the internet. Another example may be a social networking site in which a user or client access files or data from a remote or third party website. While specific examples are provided, any number of uses or examples may be acceptable for the purposes of the present invention. The remote server 22 may also contain relevant information related to the user, and may include, for example, user identifying information, such as but not limited to an individual's name, phone number, or other similar information.

Figure 4:
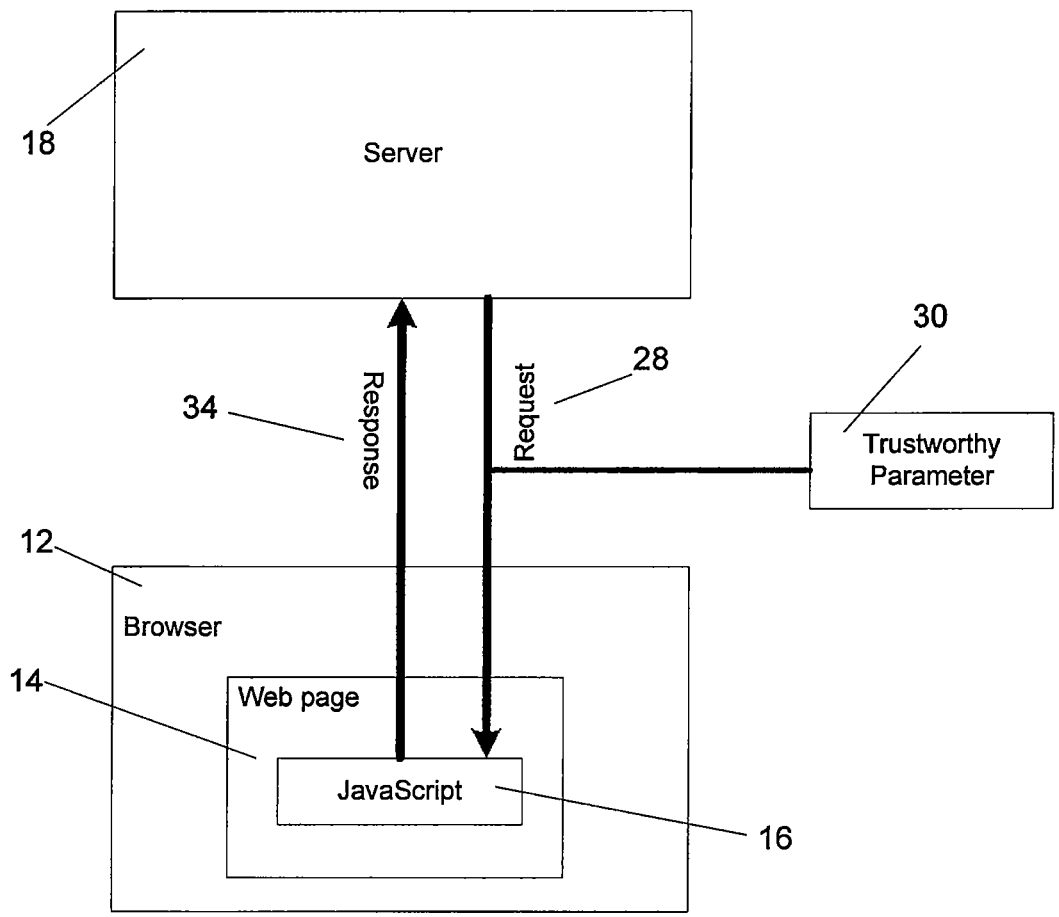
FIG. 4 is a flow chart illustrating the flow of information between the client and the original server in the mechanism for inserting trustworthy parameters of FIG. 2.

In operation of an embodiment of the present invention, a webpage 14 executing JavaScript 16, submits a request 28 to an original server 18 (see FIGS. 2 & 4). The request 28 may include any suitable information for forming a trusted relationship between the client 10 and the original server 18, such that the original server can trust or know the source of the information or request it receives. This information forms one or more trustworthy parameters 30. The initial or first request 28 may therefore include additional or alternate information which is transmitted to the original server 18. The identifying information or trustworthy parameters 30 in the request 28 may be information which is added to the request or replaced in the request or removed from the request. In one or more examples, the information included in the request 28 may be any information suitable for identifying the client 10 or user. Thus, the identity of the end user may be used as identifying information or trustworthy parameter 30. This identifying information may also or alternatively be provided in the form of a "cookie". A further example of identifying information or trustworthy parameter 30 may include an API key, which includes trusted information. A web application may allow a user to log into the application, thus verifying the identity of the user, i.e., authentication. The web application may then allow the user to access personal information within the application. Moreover, while information may be added to a request, the proxy 20 of an embodiment may also have specific logic to detect or connect the user and the session. In other words, the proxy 20 may detect that the request is coming from the client 10 or user. Generally an end user is unable to "fake" the session cookie or identification communicated between the original server 18 and browser 12. For example, if the session identification is changed, it often forms a large random stream of data or information. As a result, the original server 18 will detect that it has not issued a session identification and is unable to identify the end user based upon the random stream. As a result of the use of identifying information or trustworthy parameter 30, a trusted relationship and communication between the browser 12 and original server 18 is formed.

In one or more embodiments, for example, if the application allows AJAX requests from the original server 18 to a remote server 22, it may do so through a proxy 20 that is part of the application. JavaScript 16 executing in the user's browser 12 may send a request 28 to the application, which then forwards the request to the remote server 22. Accordingly, as illustrated in FIGS. 2 & 5, the original server 18 in receipt of the request 28 from the trusted source, then by proxy 20, submits a request to the remote server 22.

More specifically, the original server 18 is aware of the identify of the client 10 logged into it, as well as the content of the request 28. The proxy 20 may, therefore, also be aware of the identity of the client 10, so the proxy 20 may ignore, in some instances, a client 10 identification sent from the browser 12 (since it is not always trustworthy), and can insert an actual or alternative identification. In other words, while the original request 28 from the browser 12, and specifically the information therein, cannot be trusted, the original server 18 can trust that it came from that browser 12. Thus, the original server 18 knows who the request came from, no matter what is in the request.

When the original server 18 passes a request on to the remote server 22, it may add, modify, or remove information in the request in a manner that the remote server 22 can then trust. The information may form one or more trustworthy parameters 32. For instance, the original server 18, using a proxy 20, may transmit identifying information as trustworthy parameters 32, such as that information which may identify the client 10 browser 12 identity, to the other or remote server 22, forming a trusted connection. In other words, information may be added to the initial or original request 28 or replaced in the initial request or removed from the original request. To this end, the request 28 may pass through the proxy 20 running in the server, but the proxy 20 may insert trusted information in the form of trustworthy parameters 32 into the request and serve that request with trusted information to a remote server 22.

Any information suitable for establishing or forming a trusted relationship and communication between the original server 18, proxy 20, and remote server 22 may be used as trustworthy parameters 32 for purposes of the present invention. While any type of information may be used as the identifying information, the information may be limited by the information to which the original server 18 has access. In one or more embodiments, information that the proxy 20 may inject into the request 28 as a trustworthy parameter 32 may be the identity of the end user. The proxy 20 may, thus, replace, modify, or add to the client information contained within the original request 28. For example, the proxy 20 may insert a name identifying the true client 10 logged in to the original server 18. In one further embodiment, the request submitted by the proxy 20 to the remote server 22 may include information identifying the original server 18. The proxy 20 may also communicate with a remote server 22 using specific logic. For example, an API key may be used by the proxy 20 to identify itself to the final destination server or remote server 22, such that the final destination server can trust the owner identification and viewed identification assertions passed by the proxy 20 from the client 10. Thus, the request may include information identifying the original server 18 and the client 10 information. For instance, information identifying the original server 18 may be provided in the form of an API key, which may be a large random stream that the other server issued or was configured to trust. The original server 18 may also insert arbitrary values. For example, the original server 18 may inject information into the request which identifies that the user is right-handed or some other fact or attribute that the original server 18 may know about, rather than simply identifying that the identity of the user.

Provided that the remote server 22 has received a request with acceptable trustworthy parameters 32, as shown in FIGS. 2 & 5, it returns a response 34 with the requested data or information to the proxy 20 and original server 18. The original server 18 or proxy 20 then returns the response with this data or information to the client system 10 for rendering on the webpage 14 (see FIGS. 2 & 4).

According to an embodiment described herein, the original server 18, and specifically the proxy 20, may insert information into the request 28 passed to the remote server 22 which identifies to the remote server 22 that, if it trusts the original server 18, it can trust the identity of the client 10 logged in to the original server 18. The present invention allows the proxy 20 to dynamically insert information into the request 28 so that it can be trusted by a remote server 22. Thus, a remote server 22 may safely return protected information even if the user did not explicitly authenticate with the remote server 22.

Figure 6:
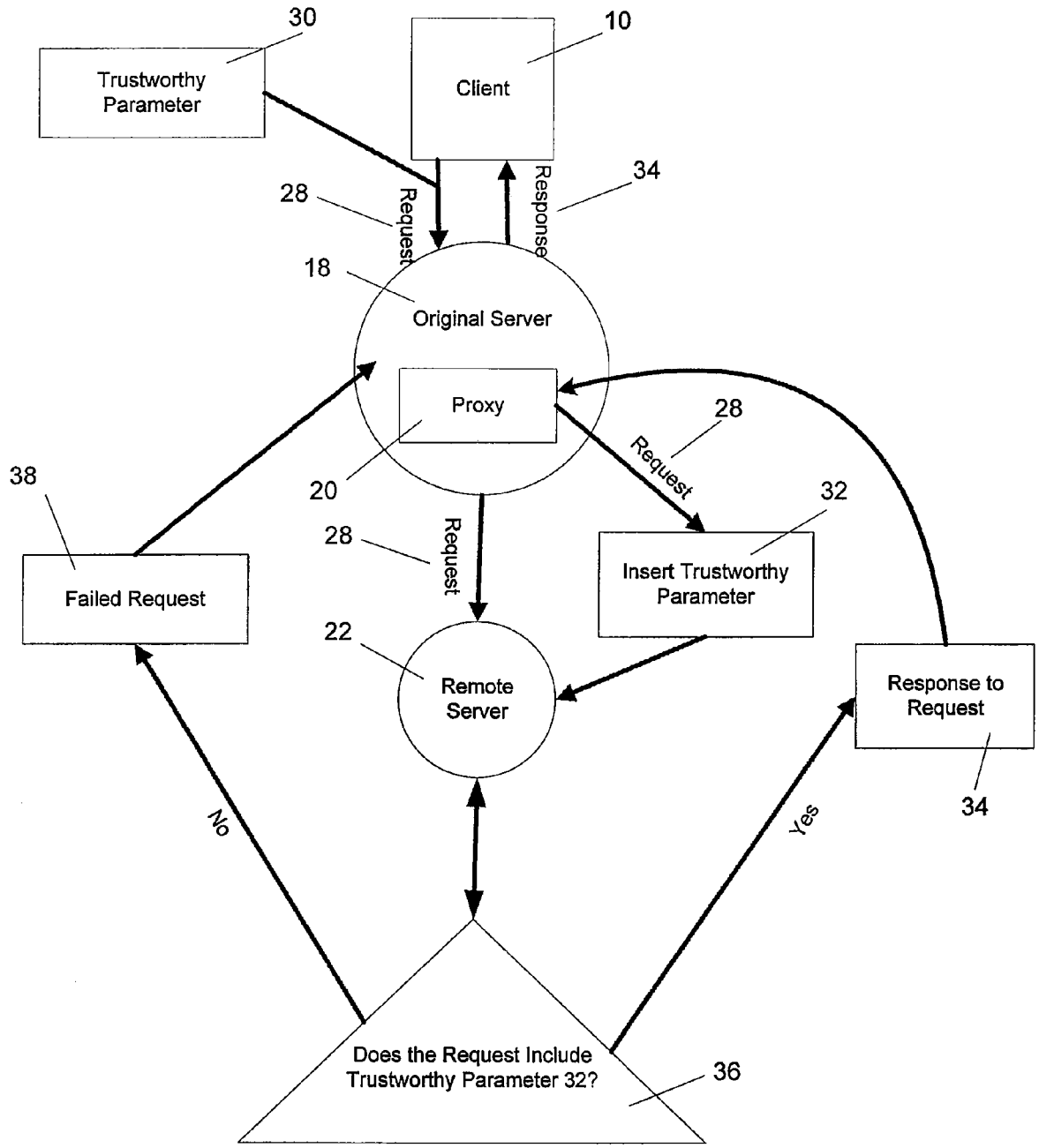
FIG. 6 is a partial functional flow diagram illustrating one or more examples of embodiments of the mechanism for inserting trustworthy parameters.

FIG. 6 represents a functional flow diagram of the an embodiment of the mechanism and method for inserting trustworthy parameters into a server-side request. For ease of illustration, FIG. 6 illustrates the client 10 only, but said client 10 is contemplated to include a browser 12 and webpage 14 operating therein. Furthermore, the request between the client 10 and the server 18 has been assumed for purposes of FIG. 6 to include a trustworthy parameter 30, such that the original server 18 may recognize the identity of the client 10 computer or origin or source of the request 28. The client 10 in the operation of the embodiment submits a request 28 for data or information to the original server 18. The server, via a proxy 20, submits the request 28 to the remote server 22. In one or more illustrated examples, the server 18 or proxy 20 inserts trustworthy parameter 32 into the request 28 prior to transmitting same to the remote server 22. In a second illustrated example, the trustworthy parameter is not inserted. The remote server 22 reviews the request for trustworthy parameters 36. If the remote server 22 detects at least one trustworthy parameter 32, it serves a response 34 to the original server 18 and proxy 20 with the requested information or data. The original server 18 then serves the response 34 to the client 10 for rendering on the client 10 computer. If the remote server 22 does not detect a trustworthy parameter 32, the request fails 38 and the response with requested information is not returned to the original server 18 or client 10.

In an alternative embodiment of the present invention, the system described herein may be applied to a static application, i.e., a form that must be filled out. In other words, the system may not be specific to the web. For example, a proxy may exist for some other protocol, such as but not limited to FMTP, or any application where it may be important to insert values into a request in a trustworthy manner. It is understood that in such static applications, details may change, such as how values are passed in any given protocol without departing from the overall scope of the present invention.

In a further alternative embodiment, rather than insertion of identifying information by the proxy, an alternative more cryptographic approach may be applied. For example, a cryptographic key may be used by the end user or client to "sign" the request. The signed request which may be transmitted via proxy to the remote server would then signal to the remote server that the assertions or values passed by the user through the proxy can be trusted.

EXAMPLES

The following examples are presented as illustrations of the mechanism for inserting trustworthy parameters and methods thereof, and are not intended to limit the overall scope of the present invention.

Example 1

In one or more examples of the operation of the system, the user may be running a webpage 14 on the client 10 computer. The user requests a remote website, for example, by selecting a hyperlink in the webpage 14. JavaScript 16 operating in a user's browser 12 makes a request to the proxy 20 for the information or data linked to the hyperlink. The request may include whatever session mechanism, or trustworthy parameter 30, original server 18 already has in place to identify the user or client 10, for example, this may be or include the session cookie, identifying the end user to the original server 18. In the embodiment, the proxy 20 receives the request 28 including session cookie or identifying information and is adapted or configured to determine the identity of the end user based upon the session cookie and/or its own session mechanism. The proxy 20 also inserts a trustworthy parameter 32, such as identifying information that identifies original server 18 and proxy 20 as being trusted by the final destination or remote server 22. The proxy 20 may also insert or include an assertion identifying information for the client 10 or identifying the client 10. The additional information proves to the additional or remote server 22 that it is the original server 18 and that it should be trusted. Upon receipt of the trusted request, the remote server 22 returns the requested data or information associated with the link to the original server 18 and proxy 20 which responds to the original request with this information for rendering on the webpage 14 for the user.

Example 2

As a further example of use of the present invention, a single website or webpage 14 may be established for remembering passwords for other websites or servers. A user may enter all his or her passwords on a single site 14. The single site may include a login requirement. Once logged in, the user may then access any other website, i.e., 22, 24 or 26, without having to reenter passwords. In other words, the original server 18 and proxy 20 may inject or add the specific login information for the remote website server 22, 24, or 26, to the request 28, which in turn would provide a response 34 to the request with the protected information.

As can be seen from the foregoing examples of one or more embodiments, the invention described herein allows the application proxy to dynamically insert information into a request to the remote server so that it can be trusted by the remote server, permitting the application proxy to retrieve protected or sensitive information from the remote server. The dynamically inserted information may be a users identity or any other suitable information to which the original server may have access. The system may be applied to any suitable type of website and may be used in any suitable environment. A currently available platform suitable for the present invention may be a social network application, although the invention is not limited thereto. Moreover, while the system is specifically described for use in web-based application, the system may be applied to alternative environments without departing from the overall scope of the present invention. For example, a proxy as described herein may be used in some other protocol. Likewise, one or more embodiments provided herein may be especially well suited for AJAX and jMaki. While the system is specifically described herein is for such use, the invention is not limited thereto. For example, instead of an AJAX initiated request, a browser may be used. The browser (or JavaScript) may pull in a full webpage from another server rather than retrieving raw data and manipulating it. In this alternative embodiment, the proxy may just carry or transmit the HTTP request or other transfer request to the remote server or final destination, injecting information it has been configured to inject into the request to establish the trusted connection, resulting in a response back to the client which may be a full or entire webpage.

The examples described allow an application to safely assert the identity of the user and the application itself into a request so that a remote server can trust that protected information may be safely included in a response. The foregoing system and method allows users to be authenticated into a remote application or server, allowing the user full access to data through the proxy web application without first having to go through, for example, an extra step of logging into the remote application. In comparison, other traditional solutions to this issue involve the remote application giving only limited access to "public" user information. Moreover, unlike traditional platforms, the client in the examples and embodiments described herein may be able to perform additional functions on a website, such as the ability to read and write on the remote website rather than viewing a file in "read-only" format. The invention allows mutually-trusted applications to be able to assert the identity of a user making the request. The assertions are performed in a safe manner because the information does not originate from the client browser. Additionally, the client may never see the identifying information used for communication between the original server and remote server, providing an additional level of security. Namely, a client or end user is not able to make its own request directly to the final destination with faked owner identification assertions. Instead, data is added as one or more parameters to the request by one of the applications before the request is sent to the other application. In other words, the addition of information to the request takes place in a manner that is transparent to the user.

Reference is made herein in detail to examples of embodiments of the invention, a method and system for inserting trustworthy parameters into a server side request, examples of which are illustrated hereinabove and in the accompanying drawings.

Although various representative embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Moreover, some portions of the detailed descriptions herein are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities. Unless specifically stated otherwise as apparent from the discussions herein, it is appreciated that throughout the present invention, discussions utilizing terms such as "receiving," "sending," "generating," "reading," "invoking," "selecting," and the like, refer to the action and processes of a computer system, or similar electronic computing device, including an embedded system, that manipulates and transforms data represented as physical (electronic) quantities within the computer system.

Although the present invention has been described with reference to preferred embodiments, persons skilled in the art will recognize that changes may be made in form and detail without departing from the spirit and scope of the invention.

The invention claimed is:

1. A system comprising:
a browser communicating a first request for a webpage to a first server; the browser receiving the webpage from the first server;
the browser rendering the webpage executing code adapted to communicate a second request with client identifying information to the first server, the second request including a first trustworthy parameter;
the first server having a proxy adapted to insert a second trustworthy parameter, identifying the proxy, into the second request received from the browser, and the proxy further adapted to communicate the second request with the second trustworthy parameter to a second server, wherein the second server is external to the browser and the first server,
whereby the second request with the second trustworthy parameter is trusted by the second server, the second server and first server each adapted to provide a response to the second request,
wherein the code executed by the webpage is limited to communicating with a same domain from which the webpage was received.

2. The system of claim 1, wherein at least one of the first and second servers is a web server.

3. The system of claim 1, wherein the second server is a remote server.

4. The system of claim 1, wherein the browser executes JavaScript and the second request is an AJAX request.

5. A system for communicating with a server comprising:
a client computer, in communication with a first server, adapted to communicate a first request for a webpage to the first server and to receive the webpage from the first server;
the client computer adapted to communicate a second request to the first server based on code executed by the webpage, the second request including a first trustworthy parameter;
the first server executing a proxy for:
inserting a second trustworthy parameter into the second request received from the client computer, the second trustworthy parameter identifying the proxy; and
communicating the second request with at least the second trustworthy parameter via the proxy to a second server in communication with the first server,
wherein the second server is external to the client computer and the first server,
wherein the code executed by the webpage is limited to communicating with a same domain from which the webpage was received.

6. The system of claim 5, wherein the second trustworthy parameter is an additional parameter added to the second request.

7. The system of claim 5, wherein the first server is adapted to insert a plurality of trustworthy parameters.

8. The system of claim 5, wherein the proxy is adapted to insert a plurality of trustworthy parameters.

9. The system of claim 5, wherein the second server is capable of serving a response to the first server and the first server is capable of serving the response to the client computer for rendering on the client computer.

10. The system of claim 5, wherein the client computer includes a browser executing JavaScript and the second request is an AJAX request.

11. A method of communicating in a networked environment comprising:
a client computer communicating a first request for a webpage to an original server;
the client computer receiving the webpage from the original server;
the client computer communicating a second request to the original server based on code executed by the webpage, the second request including identifying information;
the original server inserting a first trustworthy parameter identifying the original server into the second request and communicating the second request with the first trustworthy parameter via a proxy to a remote server;
the remote server serving a response to the second request to the original server; and
the original server serving the response to the client computer, wherein the remote server is external to the client computer and the original server,
wherein the code executed by the webpage is limited to communicating with a same domain from which the webpage was received.

12. The method of claim 11, wherein the client computer has a browser executing JavaScript, wherein JavaScript communicates the second request to the original server.

13. The method of claim 12, wherein the second request is an AJAX request.

14. The system of claim 1, wherein the code executed by the webpage comprises JavaScript.

15. The system of claim 1, wherein the code is executed by the webpage locally in the browser.

16. The system of claim 1, wherein the second trustworthy parameter comprises an API key.

17. The system of claim 1, wherein the proxy is further adapted to determine whether the second server is within a list of acceptable destinations prior to communicating the second request with the second trustworthy parameter to the second server.

18. The system of claim 1, wherein the second request is communicated from the proxy to the second server with the first trustworthy parameter and the second trustworthy parameter.

19. The system of claim 5, wherein the second trustworthy parameter comprises an API key.

* * * * *